(12) United States Patent
Guyer et al.

(10) Patent No.: US 11,675,664 B2
(45) Date of Patent: Jun. 13, 2023

(54) MAINTAINING DATA INTEGRITY THROUGH POWER LOSS WITH OPERATING SYSTEM CONTROL

(71) Applicant: EMC IP HOLDING COMPANY LLC, Hopkinton, MA (US)

(72) Inventors: James Guyer, Northboro, MA (US); Richard Boyle, Quincy, MA (US); John Burroughs, East Sandwich, MA (US); Clifford Lim, Hopkinton, MA (US); Michael Salerno, Jr, Temple, NH (US)

(73) Assignee: Dell Products, L.P., Hopkinton, MA (US)

( * ) Notice: Subject to any disclaimer, the term of this patent is extended or adjusted under 35 U.S.C. 154(b) by 3 days.

(21) Appl. No.: 17/396,668

(22) Filed: Aug. 7, 2021

(65) Prior Publication Data

US 2023/0043379 A1   Feb. 9, 2023

(51) Int. Cl.
| | |
|---|---|
| *G06F 11/00* | (2006.01) |
| *G06F 11/14* | (2006.01) |
| *G06F 11/07* | (2006.01) |
| *G06F 1/26* | (2006.01) |
| *G06F 1/30* | (2006.01) |
| *G06F 1/3287* | (2019.01) |

(52) U.S. Cl.
CPC ............. *G06F 11/1446* (2013.01); *G06F 1/30* (2013.01); *G06F 1/263* (2013.01); *G06F 1/3287* (2013.01); *G06F 11/0727* (2013.01); *G06F 11/0772* (2013.01); *G06F 11/1458* (2013.01); *G06F 2201/805* (2013.01)

(58) Field of Classification Search
CPC ............. G06F 11/0727; G06F 11/0772; G06F 11/1446; G06F 11/1458; G06F 1/30; G06F 1/3287
See application file for complete search history.

(56) References Cited

U.S. PATENT DOCUMENTS

| | | | | |
|---|---|---|---|---|
| 5,915,118 | A * | 6/1999 | Migita | G06F 1/30 365/228 |
| 2006/0212644 | A1* | 9/2006 | Acton et al. | G06F 1/30 711/E1.2019 |
| 2011/0058440 | A1* | 3/2011 | Smith et al. | G06F 11/1441 365/229 |
| 2012/0054520 | A1* | 3/2012 | Ben-Tsion | G06F 1/324 714/14 |
| 2017/0329638 | A1* | 11/2017 | Ragupathi et al. | G06F 1/28 |
| 2019/0250688 | A1* | 8/2019 | Alaqeel et al. | G06F 1/305 |

* cited by examiner

*Primary Examiner* — Marc Duncan
(74) *Attorney, Agent, or Firm* — Anderson Gorecki LLP

(57) ABSTRACT

A storage controller has an operating system (OS) and power control firmware configured to manage use of battery power during a power outage event. The OS specifies to the power control firmware first and second sets of physical components that should be shed by power control firmware during a two-phase vault process. Upon a power failure, the power control firmware turns off power to the first set of physical components and notifies the OS of the power failure. The OS determines whether to abort or continue the vault process. If the OS aborts the vault process, the power control firmware restores power to the first set of physical components. If the OS continues the vault process, the power control firmware turns off power to the second set of physical components, the OS saves application state, and moves all data from volatile memory to persistent memory.

20 Claims, 6 Drawing Sheets

MAINTAINING DATA INTEGRITY THROUGH POWER LOSS WITH OPERATING SYSTEM CONTROL

FIELD

This disclosure relates to computing systems and related devices and methods, and, more particularly, to a method and apparatus for maintaining data integrity in a storage system through power loss while maintaining operating system control.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage controller has an operating system (OS) and power control firmware configured to manage the use of battery power during a power outage event. The operating system specifies to the power control firmware a first set of physical components that should be shed by power control firmware during a first phase of a vault process, and a second set of physical components that should be shed during a second phase of the vault process. In the event of a power failure, the power control firmware turns off power to the first set of physical components and notifies the operating system of the power failure. The operating system determines whether to abort or continue the vault process. If the operating system aborts the vault process, the power control firmware restores power to the first set of physical components if it is safe to do so. If the operating system does not abort the vault process, the power control firmware turns off power to the second set of physical components, and the operating system manages completion of the vault process by saving application state, and moving all data from volatile memory to persistent memory. If power has been restored after completion of the vault process, the operating system is notified and manages the process of restarting the storage controller. If power is not restored to the storage controller after completion of the vault process, backup battery power is disabled and the storage controller is shut down.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
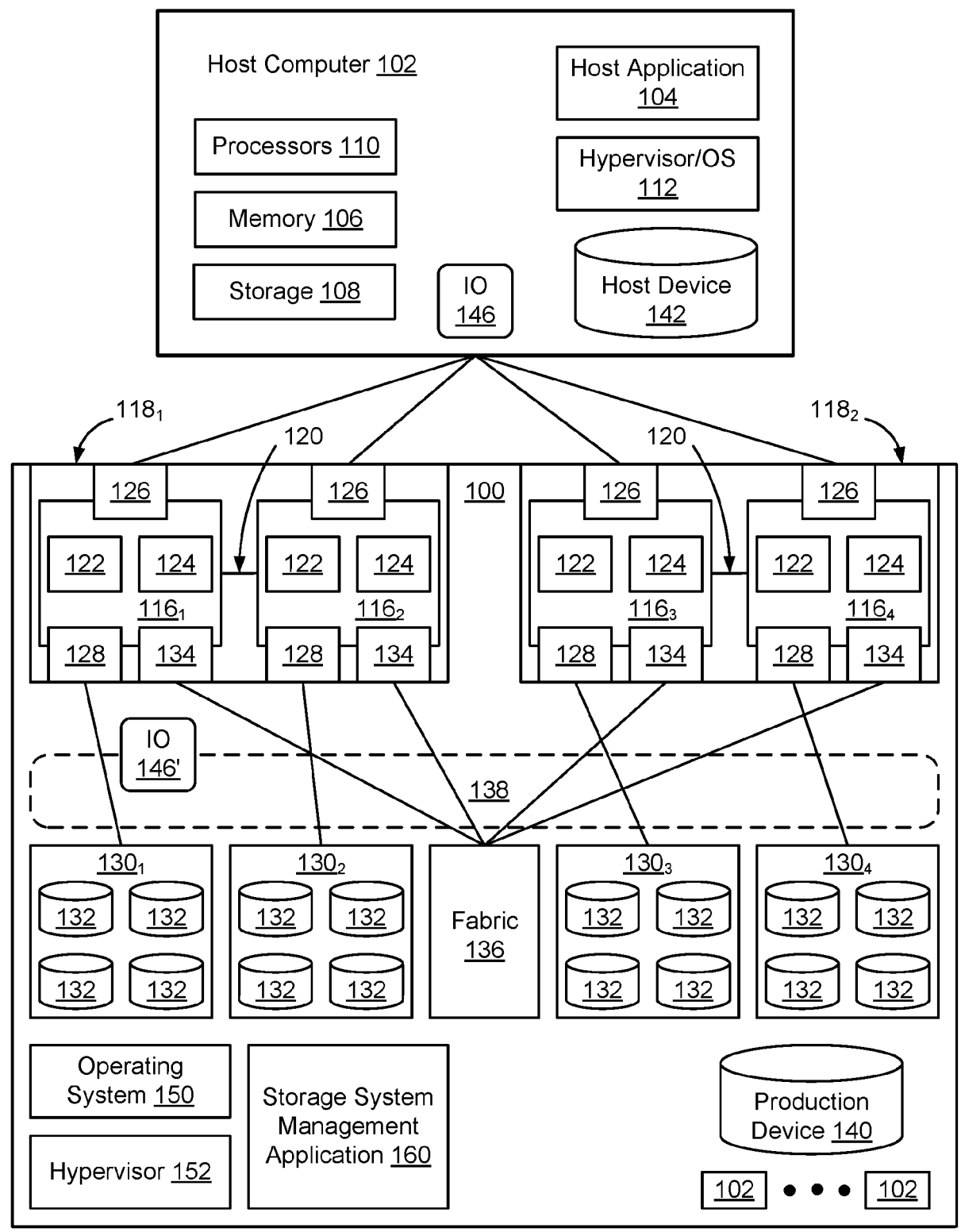
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$–$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118. As used herein, the term "storage controller" will be used to refer to a component of the storage system, such as a storage engine 118, that has its own power supply, battery backup, and multiple physical components implemented, for example, using printed circuit boards or integrated circuits. A given storage system may have multiple storage controllers, depending on the implementation.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$ -$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104. Production device 140 is implemented using a collection of storage resources referred to herein as a storage group.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

In a storage system with multiple fabric-connected enclosures, maintaining customer data integrity and data models is increasingly complex. In the event of a power outage, whether transitory or extended, any customer data that is stored in volatile memory such as RAM must be moved to persistent memory. The process of moving data from volatile memory to persistent memory will be referred to herein as a "vault" process.

To enable data to be vaulted, each physical enclosure within the storage system 100 is provided with a battery that can supply power to the physical components that are located within the physical enclosure. As the power for each individual enclosure goes higher and higher, battery capacity is not keeping up with demands, requiring innovative solutions to manage power to stay within the boundaries of the battery technology and control cost. Additionally, storage solution up-time, especially in the high-end enterprise space, is of the utmost importance. Where the primary storage controllers are packaged and powered separately from each other, and are packaged and powered separately from fabric connected drive shelves and other storage system elements, the primary storage controllers should be able to ride-through power events if other storage system elements are not yet committed to powering down.

Conventionally, each storage controller has a battery that will provide power to some or all of the components of the storage controller during the vault process. Some storage controllers have a large battery that is able to provide sufficient battery power to keep all components of the storage controller powered during the entire vault process. While this enables the OS to continue running during the vault process, which enables the OS to manage saving of customer application state, it unfortunately requires the use of a large battery, which increases the cost of the storage controller. Other solutions supply battery power only to a portion of the components of the storage controller, but do not allow the OS to continue to run and perform application state save. Neither of these implementations enable the storage controller to ride through a transitory power outage - once a vault process is started, the vault process will proceed to conclusion and the storage controller would then need to be restarted. Since completing a vault process and restarting the storage controller can take several minutes, executing a vault process is disruptive to applications that are reliant on the storage controller.

According to some embodiments, a storage controller 275 is provided with power control firmware configured to enable the storage controller 275 to ride through transitory power disruptions. By enabling the storage controller 275 to recover from a transitory power disruption, without completing the vault process and shutting down, it is possible to increase the amount of time the storage controller 275 is operational thus minimizing down time. Further, by configuring the power control firmware to implement a phased vault process, in which subsets of the physical components of the storage controller 275 are shut down at different times, it is possible to use a smaller battery 270 to provide backup power to the storage controller 275 thus reducing the overall cost of the storage controller 275.

Figure 2:
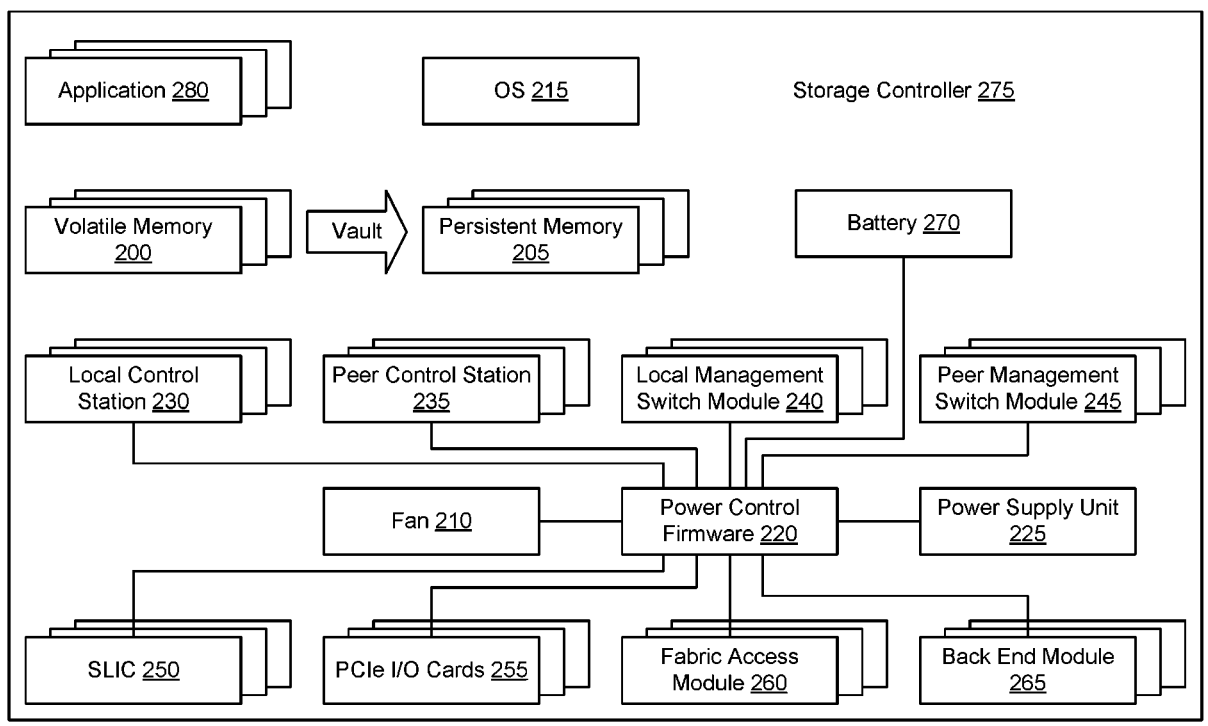
FIG. 2 is a functional block diagram of an example storage controller, according to some embodiments.

FIG. 2 is a functional block diagram of an example storage controller 275, according to some embodiments. As shown in FIG. 2, in some embodiments a storage controller 275 includes a volatile memory 200 and persistent memory 205. Volatile memory 200, in some embodiments, is memory that is built such that data stored in the volatile memory 200 will be lost when power is not supplied to the volatile memory 200. In the event of a power outage, to prevent data loss, data is copied from the volatile memory 200 to persistent memory 205 using a vault process.

As shown in FIG. 2, an example storage controller 275 may have multiple physical components. The particular collection of physical components may depend on the particular embodiment, and the collection of physical components shown in FIG. 2 is meant to be merely illustrative. In FIG. 2, the storage controller 275 is shown as having a local control station 230, peer control station 235, local management switch module 240, peer management switch module 245, Small Logical Interface Cards (SLIC) 250, PCIe I/O cards 255, Fabric Access modules 260, back-end modules 265, a temperature control system such as a fan 210, and other physical components. Each of these physical components is typically implemented using a separate printed circuit board which is supplied power from a power supply unit 225 under the control of power control firmware 220. In the event of a power outage, a battery 270 contained in the storage controller 275 provides temporary power to the physical components of the storage controller 275, which is distributed by power control firmware 220 to select components, as described in greater detail below. Operating system 215 runs on storage controller 275 to manage execution of the storage controller 275 to enable the storage controller 275 to provide storage services to host applications 104 and maintains state of applications 280.

Figure 3:
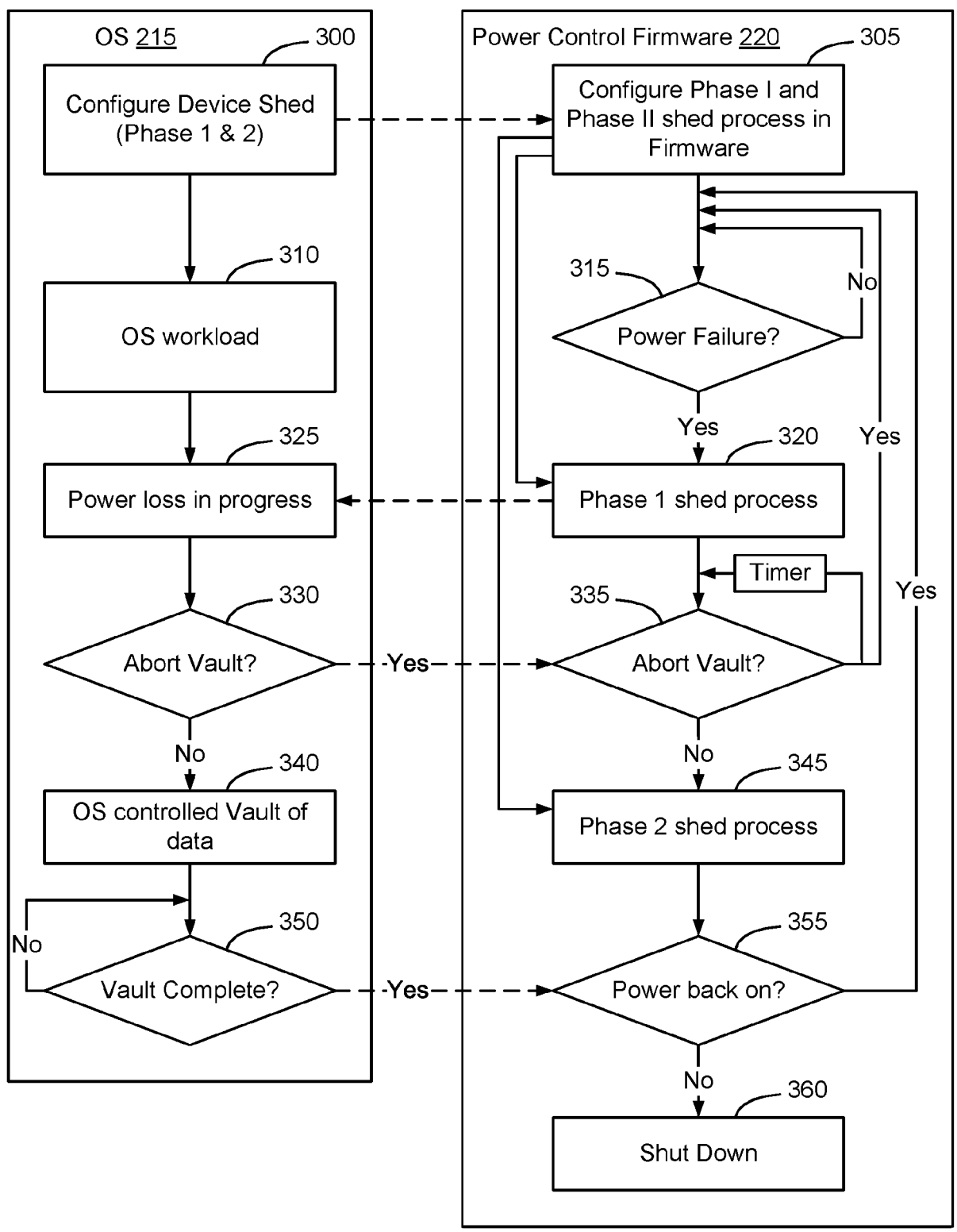
FIG. 3 is an example flow chart of a vault process implemented by an operating system and power control firmware of a storage controller, the vault process being designed to maintaining data integrity through power loss with operating system control, according to some embodiments.

FIG. 3 is a flow chart of an overview of a vault process implemented by an operating system 215 and power control firmware 220 of a storage controller 275. The vault process shown in FIG. 3 is designed to maintain data integrity through power loss events, while maintaining operating system control. Actions taken by the operating system 215 are shown on the left-hand side of FIG. 3, and actions taken by the power control firmware 220 are shown on the right-hand side of FIG. 3. Interactions between the operating system 215 and power control firmware 220 are shown using dashed lines. Additional interactions between the power control firmware 220 and operating system 215 may occur, as well, depending on the implementation.

In FIG. 3, the power control firmware 220 is able to be configured by the operating system 215 to implement a multi-phase vault process that is managed by the operating system 215. In some embodiments, the first phase of the vault process is implemented by the power control firmware 220 by causing power to be turned off to a first group of the physical components of the storage controller 275. The power control firmware 220 also notifies the operating system 215, during the first phase, that a power outage has occurred.

After being notified of the power outage, the operating system 215 determines whether the power outage is transient and affecting only the storage controller 275, or if the power outage is more widespread within the storage system 100. The operating system 215 may implement this determination in connection with determining the power status of other components of the storage system 100.

If the power outage is determined by the operating system 215 to be transient, the operating system will notify the power control firmware 220 to abort the vault process to restore power to all components of the storage controller 275. If the power outage is determined to be more widespread, the operating system 215 will notify the power control firmware 220 to continue the vault process. The power control firmware 220 will then proceed to phase two of the vault process, in which the power control firmware 220 will cause power to be turned off to a second group of physical components of the storage controller 275. The operating system 215, during this phase, vaults data from volatile memory 200 to persistent memory 205, and saves all application 280 state.

At the end of the vault process, the operating system 215 notifies the power control firmware 220 that the vault is complete. The power control firmware 220 performs a final power check, and if power has been restored, notifies the operating system 215 that power has restored so that the operating system 215 can manage recovery of the storage controller 275. If power has not been restored, the power control firmware 220 disables any backup battery power source thereby causing the storage controller 275 to power off.

By implementing a multi-phase vault process, it is possible to stay within constraints of the battery 270, by preventing the components of the storage controller 275 from drawing too much current from the battery 270. Further, the multi-phase vault process enables the storage controller 275 to manage transient power outages without requiring the storage controller 275 to fully shut down once the vault process has been initiated. Finally, since the vault process is managed by the operating system 215, it is possible to enable more complex data models to be protected in persistent memory 205, thus reducing the amount of time it takes to restart the customer applications once power has been restored.

As shown in FIG. 3, in some embodiments the operating system 215 and power control firmware 220 collaboratively manage the vault process. In some embodiments the operating system 215 is used to enable the user to specify which physical components should be powered down in each phase of the vault process (block 300). In some embodiments, the storage controller 275 will have a set of default physical components that are to be powered down in each phase of the vault process, but the user can change the order and selection of the physical components that are shut down in each phase. Once the physical components have been selected, the operating system programs the power control firmware 220 to configure the power control firmware 220 to specify which physical components should be turned off by the power control firmware 220 during phase one and phase two of the vault process (block 305). Once the power control firmware 220 has been configured, the operating system 215 implements normal operating system workload (block 310) and the power control firmware 220 watches for a power failure (block 315).

If a power failure is detected (a determination of YES at block 315) the power control firmware 220 will implement phase one of the vault process (block 320), in which power is turned off to a first subset of physical components of the storage controller 275, and the operating system 215 is notified of the power failure (block 325).

After the power control firmware 220 executes phase one of the vault process, the power control firmware 220 waits for an instruction from the operating system 215 as to whether it should continue the vault process or to abort the vault process (block 335). When the operating system 215 receives notice that there is a power loss in progress (block 325) the operating system 215 interrogates other components of the storage system 100, such as other storage controllers 275 of the storage system 100 or back-end storage arrays of the storage system 100, to determine if the power failure is local or is more wide-spread within the storage system 100.

The operating system 215 makes a determination as to whether to abort the vault process or continue the vault process (block 330). If the operating system 215 determines that the power loss condition was transient, or localized to the storage controller 275, the operating system 215 can abort the vault process (a determination of YES at block 330). If the vault process is to be aborted, the operating system 215 signals the power control firmware 220 to abort the vault (a determination of YES at block 335). In this instance, the power control firmware 220 will perform a temperature check to determine if the temperature margin supports an abort and an optional power check, to determine if power has been restored to the storage controller 275 by the power supply unit 225 and, if so, turn power on to all of the physical components that were turned off during the phase one of the vault process.

If the operating system 215 determines that the vault process should continue (a determination of NO at block 330), the operating 215 system signals the power control firmware 220 to continue the vault process (a determination of NO at block 335). Optionally, the power control firmware 220 may automatically determine that the vault process is not being aborted if an abort vault signal is not received from the operating system 215 within a given period of time.

If the vault process is not aborted, the power control firmware 220 enters phase two of the vault process in which additional physical components are shut down to conserve resources of battery 270 (block 345). The operating system 215 controls vaulting of data during phase two (block 340) to control the manner in which data is moved from volatile memory 200 to persistent memory 205. This enables the operating system 215 to store application 280 state as well as customer data to accelerate recovery once power is restored to the storage controller 275.

When all required data has been moved from volatile memory 200 to persistent memory 205, the operating system 215 will determine that the vault process has been completed (a determination of YES at block 350). The operating system 215 then signals the power control firmware 220 that the vault is complete.

The power control firmware 220, upon receipt of the vault complete signal, performs a final check to determine if power has been restored to the storage controller 275 (block 355). If power has been restored to the storage controller 275 (a determination of YES at block 355), the power control firmware 220 notifies the operating system 215 that power has been restored, to enable the operating system 215 to manage recovery of the storage controller 275. If power has not been restored (a determination of NO at block 355) the power control firmware 220 disables any backup battery 270 power source thereby causing the storage controller 275 to power off (block 360). If power is subsequently restored, the storage controller 275 will be started using a normal boot process.

Figure 4:
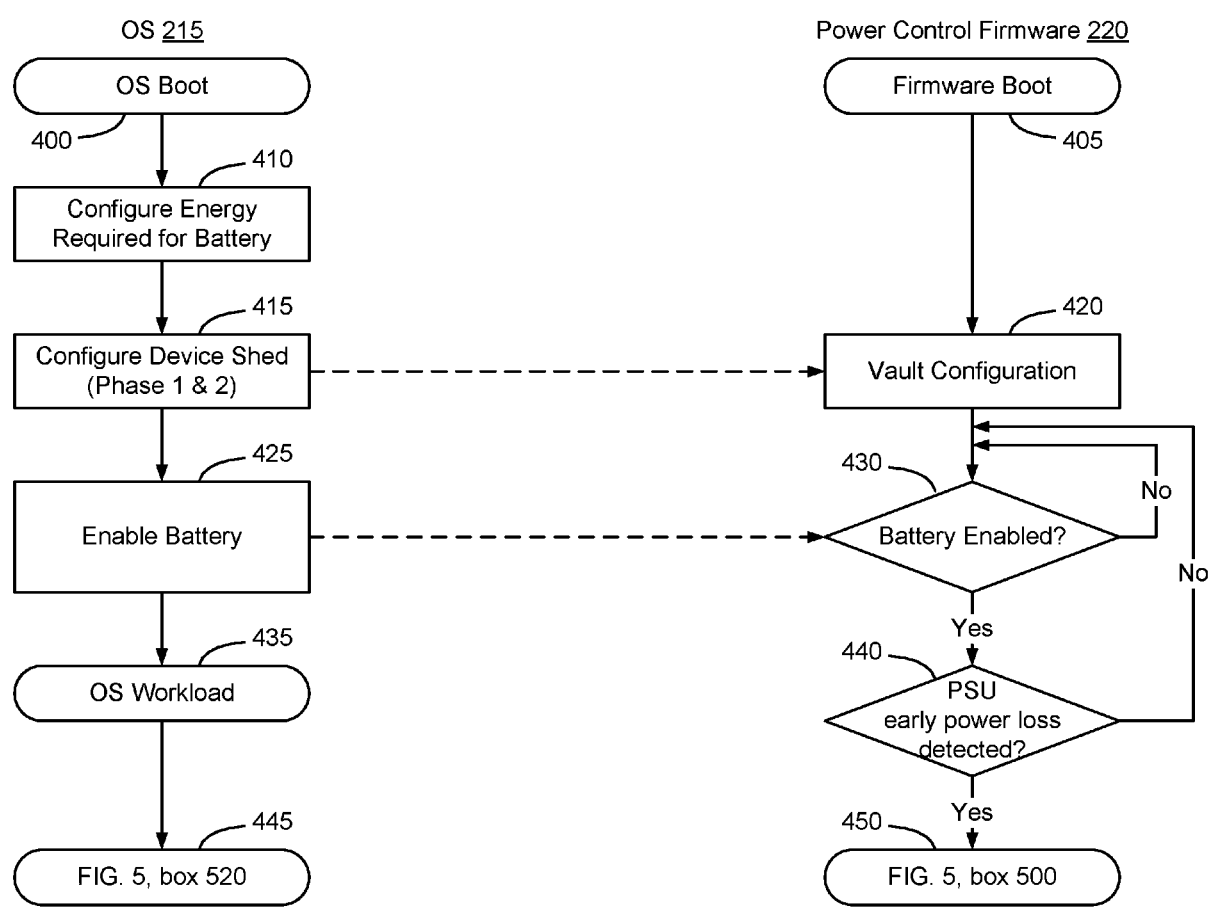
FIG. 4 is an example flow chart of a process of configuring the operating system and power control firmware to enable the storage controller to execute a vault process designed to maintain data integrity through power loss with operating system control, according to some embodiments.
Figure 5:
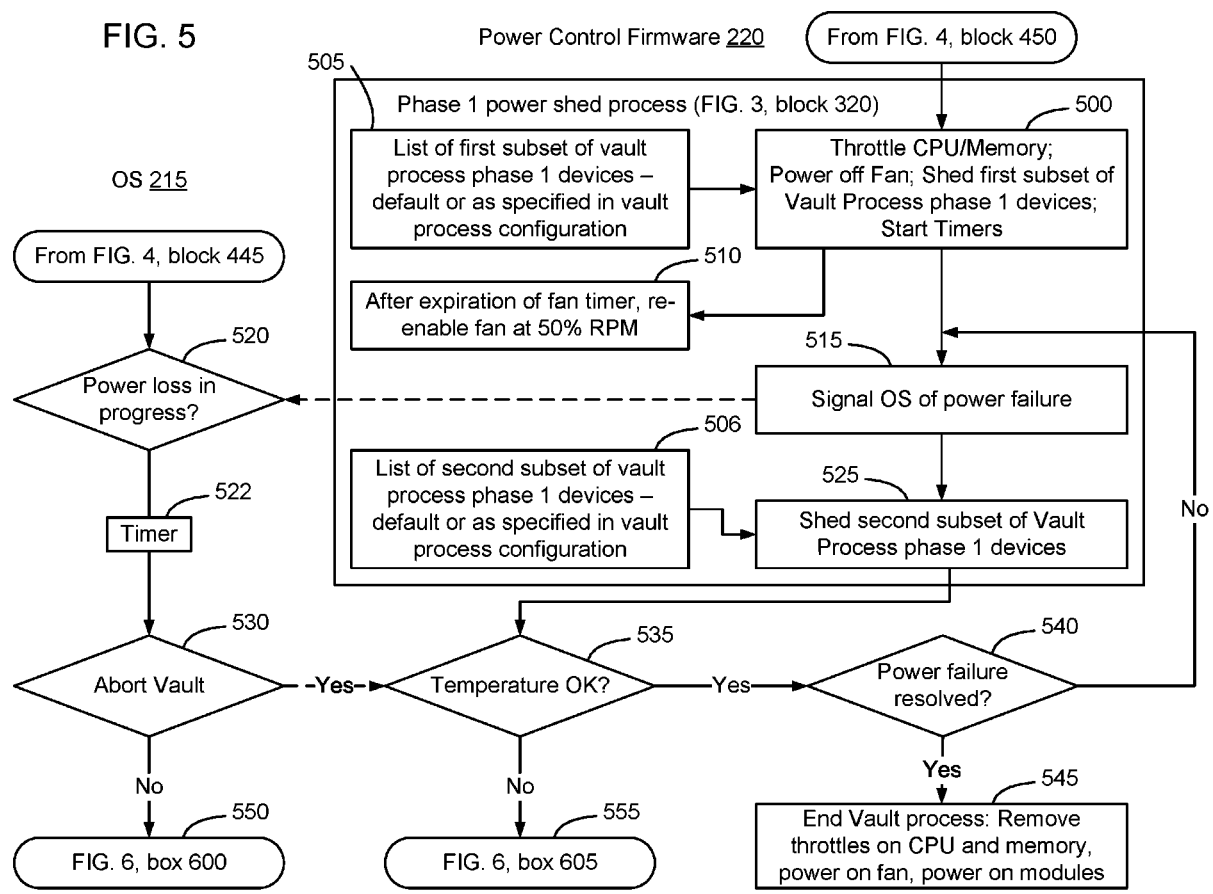
FIG. 5 is an example flow chart of phase one of the vault process configured to maintain data integrity through power loss with operating system control, according to some embodiments.
Figure 6:
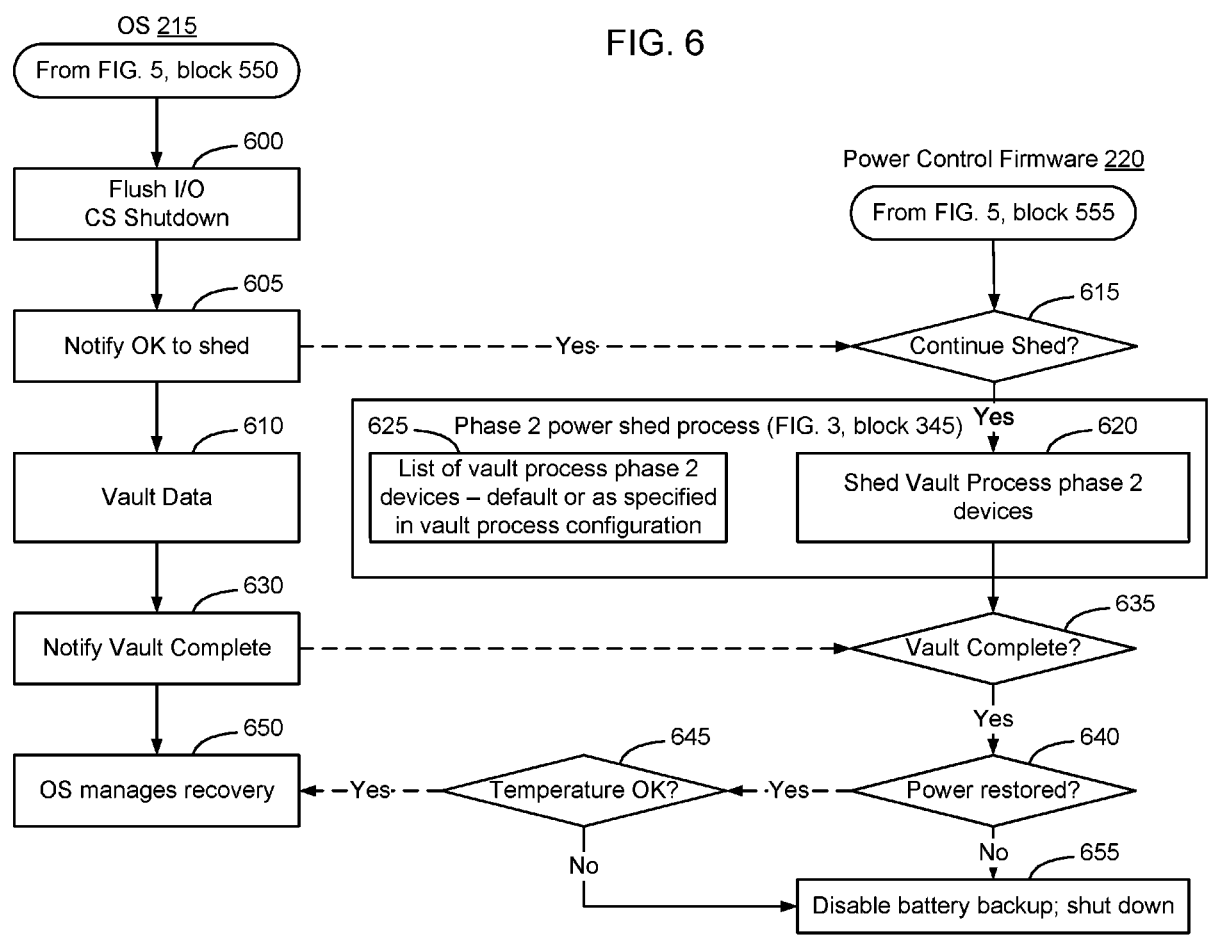
FIG. 6 is an example flow chart of phase two of a vault process configured to maintain data integrity through power loss with operating system control, according to some embodiments.

FIGS. 4-6 provide additional details of particular aspects of FIG. 3 in greater detail. Specifically, FIG. 4 provides additional details of how the vault process is configured, which is shown in FIG. 3 as blocks 300-315. FIG. 5 provides additional details of an example phase one of the vault process, which is shown in FIG. 3 as blocks 320-335. FIG. 6 provides additional details of an example phase two of the vault process, which is shown in FIG. 3 as blocks 340-360. Actions of the operating system 215 are shown on the left-hand side of FIGS. 4-6, and actions of the power control firmware 220 are shown in the right-hand side of FIGS. 4-6. Interactions between the operating system 215 and power control firmware 220 are shown using horizontal dashed arrows.

FIG. 4 is an example flow chart of a process of configuring the power control firmware 220 to enable the storage controller 275 to execute a vault process designed to maintain data integrity through power loss with operating system control, according to some embodiments. As shown in FIG. 4, when the storage controller 275 is first turned on, the operating system 215 will boot (block 400) and the power control firmware 220 will boot (block 405). The operating system 215 will configure the energy required for the battery 270 (block 410) and configure the vault process by determining which physical components should be powered down ("shed") in each phase of the vault process. In some embodiments, user input may be obtained by the operating system 215, for example via a storage system management application 160 (see FIG. 1) to enable the user to control execution of the vault process. The configuration of the vault process is then programmed into the power control firmware 220 by the operating system 215 (block 420).

The power control firmware 220 waits for the battery 270 to be enabled (block 430). Once the operating system 215 instructs that the battery 270 should be enabled (block 425), the power control firmware 220 will enable the battery 270 (block 430) and enter a power protection mode in which the power control firmware 220 will monitor power from the Power Supply Unit (PSU) 225 to detect any early power loss (block 440). During normal operation, the operating system 215 will execute the operating system workload in a normal manner (block 435).

If a power loss is detected by the power control firmware 220 (a determination of YES at block 440) the power control firmware 220 will enter phase one of the vault process, and the process continues at FIG. 5, boxes 500 and 520.

FIG. 5 is an example flow chart of phase one of the vault process configured to maintain data integrity through power loss with operating system control, according to some embodiments. As shown in FIG. 5, during phase one of the vault process, in some embodiments the power control firmware 220 uses the vault configuration information from FIG. 4, box 420 to configure which physical components of the storage controller 275 should be turned off and the order in which these physical components should be turned off during phase one of the vault process. The particular physical components that are to be turned off in the example phase one process shown in FIG. 5 are identified in boxes 505 and 506. In particular, as shown in FIG. 5, in some embodiments the power control firmware 220 shuts off power to a first subset of physical components (block 500) identified in block 505, signals the operating system 215 of the power failure (block 515), and then shuts off power to a second subset of physical components (block 525) identified in block 506.

The particular order in which the phase one physical components are shut down relative to signaling the operating system 215 of the power failure may vary depending on the implementation. For example, in some embodiments the power control firmware 220 may be implemented to immediately throttle CPU and memory and power off the fan 210. The power control firmware 220 may also be configured to immediately turn off power to a first subset of physical components, such as all non-PCIe components. Example non-PCIe components may include local Management Switch Modules (MSM) 240, peer MSM 245, local Control Station (CS) modules 230, and peer CS modules 235, although another subset of physical components may be selected depending on the implementation and the configuration specified by the user via the operating system 215.

In some embodiments, when the fan 210 is turned off, a fan timer is started. To prevent the storage controller 275 from overheating, the fan is turned on after expiration of the fan timer. For example, the fan timer can be set to five seconds, such that after expiration of five seconds the fan 210 will automatically turn back on. Of course, other fan timer lengths may be used as well, and five seconds is merely an example. In some embodiments, after turning off the fan 210, when the fan 210 is turned back on the fan 210 is run at a reduced power mode, such as at 50% rpm, to reduce the amount of power used by the fan 210.

After signaling the operating system 215 of the power failure (block 515) the power control firmware 220 continues turning off power to the second subset of physical components. Example physical components that may be included in the second subset of physical components may include Back End Modules (BEM) 265, SLICs 250, and PCIe IO Cards 255, although other collections of physical components may be included in the second subset, depending on the implementation.

Batteries have two critical factors that need to be managed: peak power capacity and total energy capacity. For high-power systems, it becomes difficult to manage these factors and maintain data integrity in a clean way. By implementing the vault process using two flexible phases, in which power is shed to specified physical components, it is possible to manage both of these aspects of how power is drawn from battery 270.

In some embodiments, when an Early Power Warning (EPOW) alert state is received from the power supply unit 225, the power to the fan 210 is stopped. To reduce power consumption by the CPU, in some embodiments the power control firmware 220 asserts Processor Hot (PROCHOT) and Memory Hot (MEMHOT) signals to the CPU and Memory to throttle those components. Additionally, non-PCIe attached devices are powered down. These are done specifically to keep the amount of power drawn by the storage controller 275 below the peak power output of the battery 270, to prevent the battery 270 from entering an over-current state, which could cause the battery 270 to turn off. Having the battery 270 turn off its output stage to prevent against an over-current condition would cause customer data loss and, as such, is undesirable. Further, by keeping the CPU powered, it is possible to continue executing the operating system 215 thus enabling the operating system 215 to manage the vault process.

In some embodiments, the power control firmware 220 uses a System Management Interrupt (SMI) to notify the operating system 215 that a power loss has occurred (block 515). After notification, additional phase one shedding is performed. In some embodiments, the second subset of devices includes front-end or non-critical input/output devices involved in outstanding data-path transactions. If the operating system 215 signals to proceed with the vault, phase two devices are the remainder of the IO devices that needed to be safely quiesced to ensure data integrity. Example phase two devices include the fabric access modules 260, offload engines, and any other physical components that have not been shut down in phase one, and which require a delay to flush before they can be turned off. The particular devices that are shed in each phase is configurable by the operating system 215 over a management interface such as Intelligent Platform Management Interface (IPMI), so that particular solutions can be optimized for a particular storage controller configuration rather than being bound to particular behaviors and slot configurations.

Upon receipt of the notification (block 520), the operating system 215 starts a ride-through timer (block 522) to determine whether to proceed with the vault. There are brown-out conditions that can result in a storage controller 275 going down before the storage system 100, as a whole, is ready to commit to a vault. The power loading conditions of the storage controller 275, vs other storage system elements, may result in the storage controller 275 committing to a vault prior to the other elements dropping out and forcing the storage system 100 into this state. For optimal service up time, in some embodiments the operating system 215 implements a ride-through timer (block 522) to enable the storage controller 275 to survive a transient power outage event without being forced to shut down or enter into a reset state.

In some embodiments, as shown in FIG. 5, when the operating system 215 receives notification that a power loss is in progress (block 520) the operating system 215 starts ride-through timer 522. An example duration of the ride-through timer may be 6 ms, although the particular duration of the ride-through timer will depend on the particular implementation. Before expiration of the timer, the operating system 215 is prevented from perceiving a power loss and entering the vault protection unduly. At the end of the ride-through timer, the operating system 215 makes a determination of whether to abort the vault process (block 530). The operating system 215 has greater context of other equipment in the storage system 100, and therefore can determine if the power outage is localized to the particular storage controller 275 or if the power outage is also affecting other components of the storage system 100. In some embodiments the operating system 215 can notify the power control firmware 220 to abort the vault process using a firmware management interface such as IPMI.

If a decision is made to abort the vault (a determination of YES at block 530) the operating system 215 signals the power control firmware 220 that the vault should be aborted. When the power control firmware 220 is instructed to abort the vault, the power control firmware performs a temperature check (block 535) to determine if temperature margins support an abort (a determination of YES at block 535). In some embodiments, the power control firmware 220 also determines whether power has been restored from the power supply unit 225 (block 540). If the temperature margins are do not support an abort (a determination of NO at block 535) or if power has not been restored (a determination of NO at block 540), in some embodiments the power control firmware 220 returns to signal the operating system 215 of the need to continue the vault process (block 515). If the temperature margins are acceptable (a determination of YES at block 535) and power has been restored (a determination of YES at block 540), the power control firmware 220 ends the vault process (block 545). In some embodiments, ending the vault process includes removing the throttles on the CPU and memory components, bringing the fan 210 to full power, and providing power to all of the physical components (both the first and second subsets of physical components) that were shut down during the phase one vault process.

If the operating system 215 decides to not abort the vault (a determination of NO at block 530) the process continues to FIG. 6 which describes phase two of the two-phase vault process. In some embodiments, if the operating system 215 decides to not abort the vault, the operating system 215 will signal the power control firmware 220 to continue with the vault process. In some embodiments, the power control firmware 220 will automatically continue with the vault process unless the operating system 215 affirmatively instructs the power control firmware 220 to abort the vault (block 535). A timer may be used by the power control firmware 220 to automatically continue the vault process if the vault is not aborted by the operating system 215.

FIG. 6 is an example flow chart of phase two of a vault process configured to maintain data integrity through power loss with operating system control, according to some embodiments. As shown in FIG. 6, if the operating system 215 determines to not abort the vault process (a determination of NO at block 530), the operating system 215 will flush any pending IO operations and implement control system shutdown (block 600).

Once any pending IO operations have been completed, the operating system 215 will notify the power control firmware 220 that it is ok to continue shedding physical components that are not required to implement the vault process. When the power control firmware 220 receives notification that it is OK to enter phase two of the vault process (block 615) the power control firmware 220 will turn off power to the list of phase two physical components (block 620). The list of phase two physical components (block 625) is configured during the initial vault process configuration (FIG. 4, block 420). Example phase two physical components might include devices that were needed by the operating system 215 to ensure data integrity and required a delay to flush before they could be turned off. Example phase two physical components might include fabric access modules 260, and other similar devices.

The operating system 215 then proceeds to vault the data (block 610) by moving data from volatile memory 200 to persistent memory 205. Once the vault process is complete, such that all application 280 state has been saved and all data has been moved from volatile memory 200 to physical memory 205, the operating system 215 notifies the power supply firmware that the vault is complete.

While the operating system 215 is vaulting the data (block 610) the power supply firmware 220 waits for a signal from the operating system that the vault process has been completed (block 635). When signaled (a determination of YES at block 635), in some embodiments the power control firmware 220 determines whether power has been restored (block 640). If power has been restored, in some embodiments the power control firmware 220 determines whether it is safe to restore power to the storage controller 275, for example by checking to determine whether the temperature of the storage controller 275 is within an acceptable range (block 645). If power has not been restored (a determination of NO at block 640), or if the temperature is outside of the acceptable range (a determination of NO at block 645), the power control firmware 220 disables any backup battery power source thereby causing the storage controller to power off.

If power has been restored (a determination of YES at block 640), and if the temperature is within the acceptable range (a determination of YES at block 645), the power control firmware 220 notifies the operating system 215 that it is possible to recover the storage controller 275. The operating system 215 then manages recovery of the storage controller 275 to enable the storage controller 275 to resume operation.

By turning off physical components of the storage controller 275 in multiple phases, it is possible to safely manage the overall amount of power required by the storage controller 275 while giving the operating system 215 sufficient time to vault all of the data that is stored in volatile memory 200, as well as preserving application 280 state. By reducing the amount of power being drawn by the physical components of the storage controller 275, it is possible to reduce the size of the battery 270 required to provide vault protection, thus reducing the overall cost of the storage controller 275.

In some embodiments, after the power control firmware 220 signals the operating system 215 that a power loss has occurred, a system management interrupt is generated by the power control firmware 220 and provided as input to the operating system 215. At this point, the CPUs are in low power state, but the operating system 215 is still running. The SMI enables the operating system 215 to prepare for devices being dropped, and enter an OS-based vault driver while maintaining all software state and context. For larger systems that scale beyond a single storage controller 275, this allows the operating system 215 to judge if the event is impacting just one storage controller 275, or whether it is truly a power loss scenario that requires committal to the vault process. If the operating system 215 determines that the event is transient, or otherwise determines that the vault should be aborted, the "vault abort" command is provided by the operating system 215 to the power control firmware 220 to cancel the vault flow. If the operating system determines that the vault should continue, the vault will proceed leveraging the vault driver in the operating system context.

Being able to save application state is important in systems where the data being save involves metadata models with integrity calculations done on the way to the persistent storage device. Rather than binding the vault/save operation to generic and/or standardized semantics like persistent memory (PMEM) that have inherent limitations for how the data must be stored in memory, maintaining the software context enables the product to have customized manipulation and orchestration of the information to be vaulted, providing greater data integrity to serve its customers.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of maintaining data integrity in a storage system through power loss while maintaining operating system control, comprising:
   configuring, by the operating system, a multiple-phase vault process in power control firmware of a storage controller;
   detecting a power failure, by the power control firmware;
   in response to detecting the power failure, entering a first phase of the multiple-phase vault process by the power control firmware;
   notifying the operating system of the power failure by the power control firmware; and
   in response to the notice of the power failure, determining, by the operating system, whether to abort or continue the vault process;
   wherein the first phase of the multiple-phase vault process comprises turning off a fan of the storage controller, throttling a CPU of the storage controller, and turning off power to a first subset of physical components of the storage controller; and
   wherein the first subset of physical components of the storage controller is specified during the step of configuring the multiple-phase vault process by the operating system.

2. The method of claim 1, wherein if the operating system determines to abort the vault process, the method further comprising notifying the power control firmware, by the operating system, to abort the vault process.

3. The method of claim 2, wherein, upon receipt of notice to abort the vault process, the power control firmware turns on the fan, stops throttling the CPU, and turns on power to the first subset of physical components of the storage controller.

4. The method of claim 3, wherein, upon receipt of notice to abort the vault process, the power control firmware performs a power check to determine if power has been restored from a power supply unit of the storage controller before turning on the fan, and turning on power to the first subset of physical components of the storage controller.

5. The method of claim 3, wherein, upon receipt of notice to abort the vault process, the power control firmware performs a temperature check to determine if the temperature is acceptable to proceed with an abort of the vault process.

6. The method of claim 1, wherein if the operating system determines to continue the vault process, the method further comprising transferring data, under control of the operating system, from volatile memory of the storage controller to persistent memory of the storage controller.

7. The method of claim 6, further comprising saving application state, by the operating system, in connection with transferring data from volatile memory to persistent memory.

8. The method of claim 6, further comprising, after the data has been transferred from the volatile memory to the persistent memory, notifying the power control firmware by the operating system that the vault process is complete.

9. The method of claim 8, further comprising, in response to notice that the vault process is complete, determining by the power control firmware whether power has been restored to the storage controller.

10. The method of claim 9, wherein, if the power control firmware determines that power has been restored to the storage controller, the power control firmware turns on the fan and stops throttling the CPU.

11. The method of claim 9, wherein, if the power control firmware determines that power has not been restored to the storage controller, the power control firmware disables any backup battery power source thereby causing the storage controller to power off.

12. A method of maintaining data integrity in a storage system through power loss while maintaining operating system control, comprising:
  configuring, by the operating system, a multiple-phase vault process in power control firmware of a storage controller;
  detecting a power failure, by the power control firmware:
  in response to detecting the power failure, entering a first phase of the multiple-phase vault process by the power control firmware;
  notifying the operating system of the power failure by the power control firmware; and
  in response to the notice of the power failure, determining, by the operating system, whether to abort or continue the vault process;
  wherein determining, by the operating system, whether to abort the vault process comprises starting a ride-through timer, waiting for expiration of the ride-through timer, and determining by the operating system whether other components of the storage system are also experiencing power failures.

13. A method of maintaining data integrity in a storage system through power loss while maintaining operating system control, comprising:
  configuring, by the operating system, a multiple-phase vault process in power control firmware of a storage controller;
  detecting a power failure, by the power control firmware:
  in response to detecting the power failure, entering a first phase of the multiple-phase vault process by the power control firmware;
  notifying the operating system of the power failure by the power control firmware; and
  in response to the notice of the power failure, determining, by the operating system, whether to abort or continue the vault process;
  wherein the first phase of the multiple-phase vault process comprises turning off a fan of the storage controller, throttling a CPU of the storage controller, and turning off power to a first subset of physical components of the storage controller;
  wherein if the operating system determines to continue the vault process, the method further comprising notifying the power control firmware, by the operating system, to continue the vault process; and
  wherein, upon receipt of notice to continue the vault process, the power control firmware turns off power to a second subset of physical components of the storage controller.

14. The method of claim 13, wherein the second subset of physical components of the storage controller is specified during the step of configuring the multiple-phase vault process by the operating system.

15. The method of claim 13, wherein if the operating system determines to continue the vault process, the method further comprising transferring data, under control of the operating system, from volatile memory of the storage controller to persistent memory of the storage controller.

16. The method of claim 15, further comprising saving application state, by the operating system, in connection with transferring data from volatile memory to persistent memory.

17. The method of claim 15, further comprising, after the data has been transferred from the volatile memory to the persistent memory, notifying the power control firmware by the operating system that the vault process is complete.

18. The method of claim 17, further comprising, in response to notice that the vault process is complete, determining by the power control firmware whether power has been restored to the storage controller.

19. The method of claim 18, wherein, if the power control firmware determines that power has been restored to the storage controller, the power control firmware turns on the fan and stops throttling the CPU.

20. The method of claim 18, wherein, if the power control firmware determines that power has not been restored to the storage controller, the power control firmware disables any backup battery power source thereby causing the storage controller to power off.

* * * * *